United States Patent

So

[11] Patent Number: 5,601,054
[45] Date of Patent: Feb. 11, 1997

[54] DOG BARKING RESTRAINING DEVICE

[75] Inventor: Ho-Yun So, Incheon, Rep. of Korea

[73] Assignee: Han Seung Enterprise Co., Ltd., Incheon, Rep. of Korea

[21] Appl. No.: 365,588

[22] Filed: Dec. 28, 1994

[30] Foreign Application Priority Data

Oct. 18, 1994 [KR] Rep. of Korea .................... 94-26683

[51] Int. Cl.$^6$ .................................................. A01K 15/00
[52] U.S. Cl. ............................................. 119/718; 119/908
[58] Field of Search ..................... 119/718, 720, 119/721, 908, 858, 859; 340/566, 573

[56] References Cited

U.S. PATENT DOCUMENTS

| | | | |
|---|---|---|---|
| 1,657,250 | 1/1928 | Fetters | 119/858 |
| 3,608,524 | 9/1971 | Waltz | 119/718 |
| 3,673,567 | 6/1972 | McClellan, Sr. | 119/718 |
| 4,180,013 | 12/1979 | Smith | 119/908 |
| 4,202,293 | 5/1980 | Gonda et al. | 119/718 |
| 4,887,549 | 12/1989 | Powell | 119/718 |
| 4,947,795 | 8/1990 | Farkas | 119/718 |
| 5,099,797 | 3/1992 | Gonda | 119/720 |
| 5,161,485 | 11/1992 | McDade | 119/720 |
| 5,353,744 | 10/1994 | Custer | 119/721 |

FOREIGN PATENT DOCUMENTS 3237927  4/1984  Germany .................... 119/718

*Primary Examiner*—Todd E. Manahan
*Attorney, Agent, or Firm*—Richard C. Woodbridge

[57] ABSTRACT

A dog barking restraining device in which an impulse wave is applied to the neck of a dog when the dog barks to thereby refrain the dog from barking. The device includes a battery, a piezoelectric sensor for detecting a vibration signal generated from a vocal chord of a dog when the dog barks, a control unit for receiving a signal of the vocal chord of the dog detected by the piezoelectric sensor to discriminate whether or not to shock the dog, a transformer for generating a stepped up impulse wave of thousands of volts, a variable resistor for adjusting the strength (power) of the impulse wave output from the transformer, and a pair of electrodes for applying to the neck of the dog the impulse wave generated by the transformer.

4 Claims, 4 Drawing Sheets

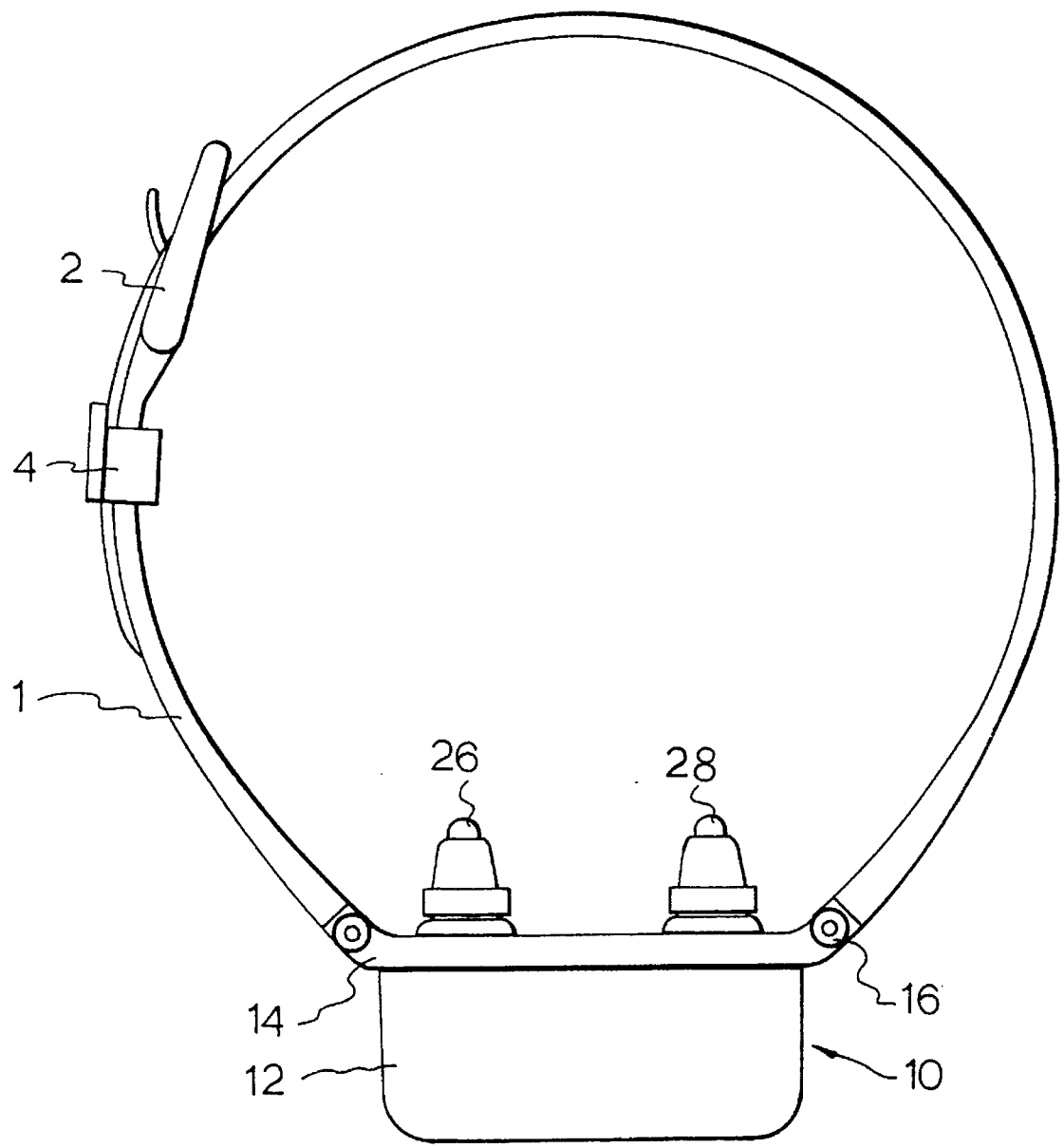

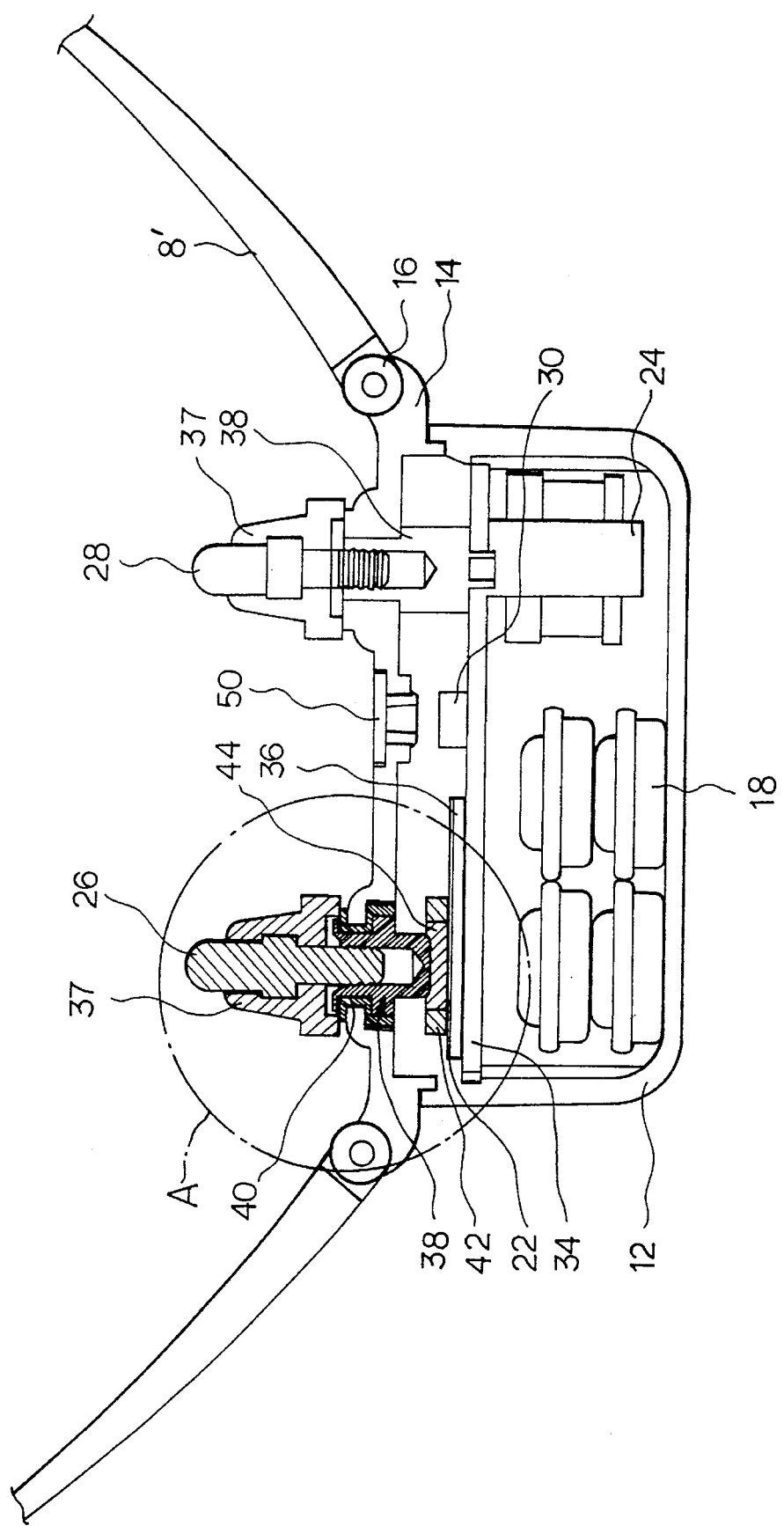

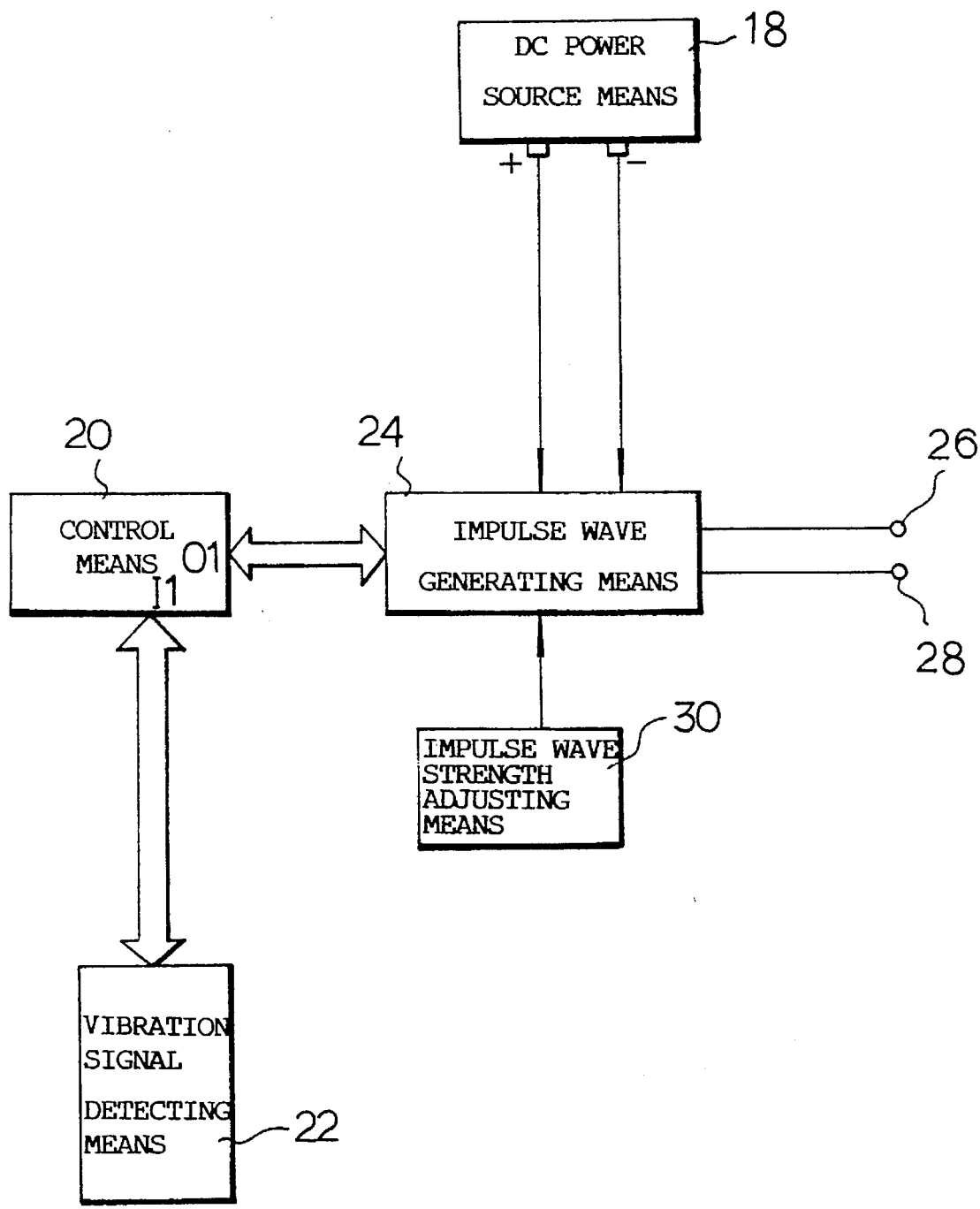

5,601,054

DOG BARKING RESTRAINING DEVICE

BACKGROUND OF THE INVENTION

1. Field of the Invention

The present invention relates to a dog barking restraining device for applying an impulse wave to the neck of a dog when the dog barks, thereby restraining the dog from barking.

2. Description of the Prior Art

Some dogs continuously bark for no apparent reason causing unpleasant noise disturbances to those within earshot of the dog. The owner of the dog often attempts to silence the barking by calling the dog or otherwise addressing the dog. These measures prove fruitless most of the time. One drastic solution to this problem has been to surgically cut or remove the dog's vocal chords. However, this has a permanent effect of silencing the dog. Thus, even when it is appropriate for the dog to bark, such as in the case of an intruder, the dog will be unable to signal its owner by barking.

SUMMARY OF THE INVENTION

Accordingly, the present invention solves the aforementioned problems. It is an object of the present invention to provide a dog barking restraining device by which the dog is restrained from barking unnecessarily.

In accordance with the object of the present invention, there is provided a dog barking restraining device, the device comprising: DC power source means; vibration signal detecting means for detecting a vibration signal generated from the vocal chords of a dog when the dog barks; control means for receiving a signal of the vocal chords of a dog detected by the vibration signal detecting means for discriminating whether or not to elicit an impulse wave; impulse wave generating means for receiving the vibration signal generated when the dog barks to output same to the vibration signal detecting means, and at the same time, for generating the impulse wave according to a control signal generated from the control means; a pair of electrodes attached to the neck of the dog for applying the impulse wave generated in the impulse wave generating means; and impulse wave strength adjusting means for adjusting the strength (power) of the impulse wave which is output from the impulse wave generating means.

BRIEF DESCRIPTION OF THE DRAWINGS

FIG. 1 is a schematic perspective view illustrating a belt for a dog collar where a dog barking restraining device is mounted according to the embodiment of the present invention.

FIG. 2A is a sectional view of the dog barking restraining device according to the embodiment of the present invention.

FIG. 3 is a control block diagram of the dog barking restraining device according to the embodiment of the present invention.

DETAILED DESCRIPTION OF THE INVENTION

Figure 2B:
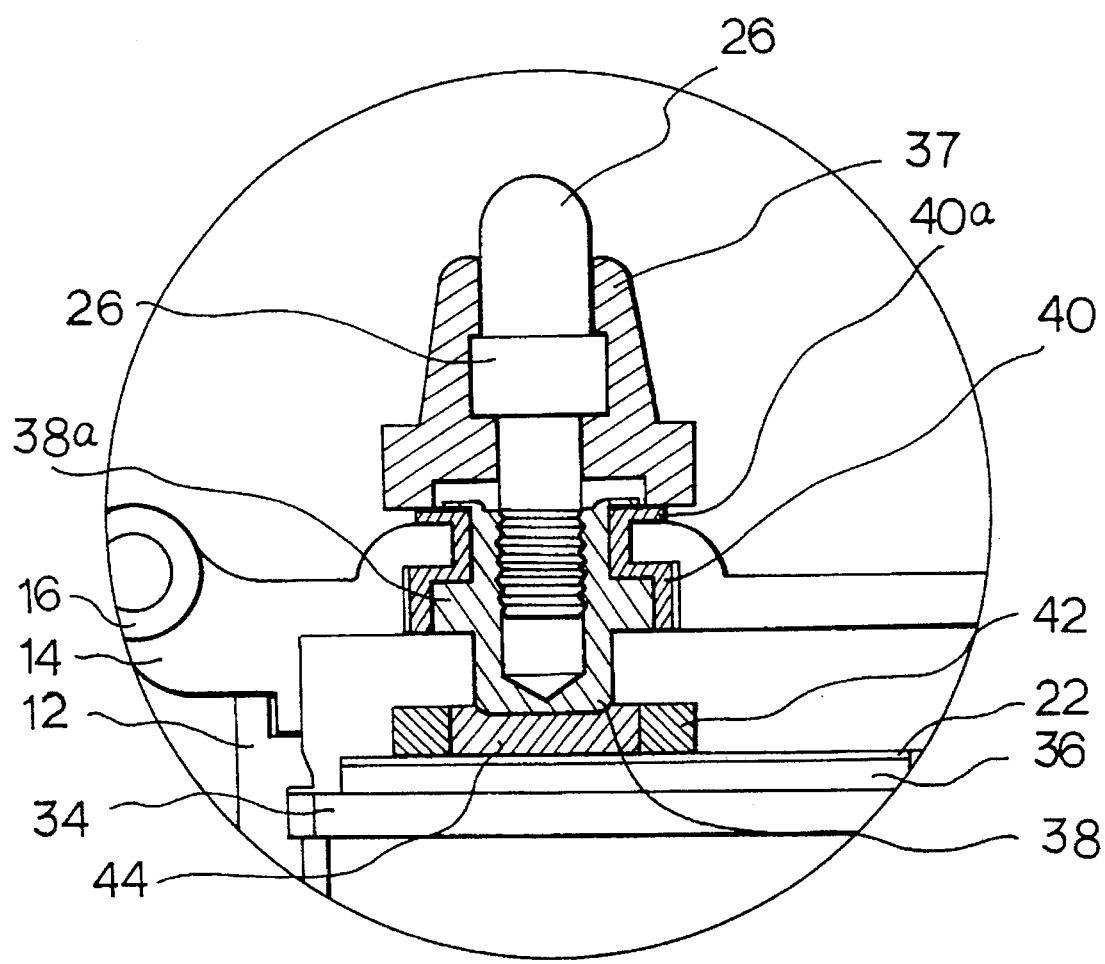
FIG. 2B is a sectional view of enlarged principal of "A" portion in FIG. 2A.

The embodiment of the present invention will now be described in detail with reference to the accompanying drawings.

FIG. 1 is a schematic perspective view illustrating a belt for a dog collar where a dog barking restraining device is mounted according to the embodiment of the present invention.

As illustrated in FIG. 1, the dog barking restraining device 10 is disposed at a middle portion of a dog collar belt 1.

The belt 1 is mounted at one end using clamp means 2 so that the other end of belt 1 is clamped and the device is fixed on the neck of a dog. Clamp means 2 is also attached at its rear side by a ring member 4 into which the opposite protruding end of belt 1 is inserted.

As illustrated in FIG. 1, the dog barking restraining device 10 comprises: a casing 12; a cover 14 for wrapping up an opening unit of the casing 12; and fastening means 16 for fastening through holes formed at both ends of the cover 14 to through holes formed at respective ends of the belt 1.

In the above description, the fastening means 16 comprises a bolt and a nut.

Furthermore, the dog barking restraining device 10, as illustrated in detail in FIGS. 2A, 2B, and 3, comprises; DC power source means 18 such as a battery or the like; vibration signal detecting means 22 for detecting a vibration signal generated from a dog's vocal chords when the dog barks; control means 20 for receiving a signal of the vocal chord of the dog detected by the vibration signal detecting means 22 to determine whether or not to elicit an impulse wave; impulse wave generating means 24 for receiving the vibration signal generated when the dog barks and outputting same to the vibration signal detecting means 22, and at the same time, for generating the impulse wave according to the control means 20 for receiving the vibration signal detected by the vibration signal detecting means 22; a pair of electrodes 26 and 28 for applying the impulse wave generated in the impulse wave generating means 24 to the neck of the dog; and impulse wave strength adjusting means 30 for adjusting the strength of the impulse wave which is output from the impulse wave generating means 24.

In the foregoing description, a nickel cadmium battery, nickel hydrogen battery, or the like can be used as the DC power source means 18 and is insertedly mounted in a battery acceptance bracket (not shown) mounted within the casing 12. The DC power source is applied to a step up transformer within the impulse wave generating means 24 thereby transforming the DC power source up to thousands of volts.

The DC power source means 18 is disposed at an upper area under the cover 14, with a printed circuit board (PCB) 34 disposed within the control means 20 at a surface thereof with a cushioning member 36 to absorb a shock transmitting to the vibration signal detecting means 22.

Furthermore, an electrode housing 38 for accepting and at the same time, for supporting the electrode by screw means is formed at a periphery thereof with a ring-shaped flange 38a, and is inserted into a through hole formed at the cover 14 via an electrode cap 40.

The electrode cap 40 is made of a resilient material to prevent vibration signals other than the vibration signal generated by the dog barking from being transmitted to the vibration signal detecting means 22.

The electrode cap 40 is integrally formed at an upper part thereof with an outwardly bent vibration transfer prevention unit 40a, so that breakaway from the cover 14 can be avoided, and at the same time, vibration signals other than the vibration signal generated by the dog barking can be prevented from being transmitted by way of an electrode support member 37 wound around a periphery of the electrode 26, and again to the vibration signal detecting means 22.

The electrode housing 38 is fixed by a rivet to the vibration transfer prevention unit 40a integrally formed with the electrode cap 40 in order to prevent the electrode cap 40 from breaking away.

Meanwhile, between the vibration detecting means 22 and the electrode housing 38, there is disposed an "O" ring 42 made of natural rubber, silicone rubber or the like, and there is formed a silicone layer 44 in a round-shaped space formed by an inner periphery of the "O" ring 42, so that the vibration signal transmitted through the electrode 26 can be cushioned.

In the above description, the "O" ring 42 is also capable of preventing the silicone from being diffused to the outside.

Furthermore, the electrode 26 is fixed at a lower end thereof where the electrode is wrapped by the electrode support member 37 to the cover 14 by being screwed within the electrode housing 38.

At this location, it should be apparent that the electrode support member 37 is at a lower end thereof tightly joined by the vibration transfer prevention unit 40a integrally formed above the electrode cap 40.

In the above description, the vibration signal generated in the vocal chord of the dog through the electrode 26 and the electrode housing 38 is transmitted via the silicone layer 44 to the vibration signal detecting means 22. The electrode 26 and the electrode housing 38 are made of conductive material so that the impulse wave generated in the impulse wave generating means 24 when the dog barks can be transmitted to the neck of the dog. The electrode housing 38 and the impulse wave generating means 24 are connected there between through a wiring (not shown).

The impulse wave adjusting means 30 is a variable resistor disposed at the PCB 34, and a through hole 50 is formed between the electrode 26 and the other electrode 28 in order to control the impulse wave adjusting means 30.

The vibration signal detecting means 22 is disposed on a sensor cushion 36 attached on the PCB 34, and comprises a piezoelectric sensor to detect the vibration signal of the vocal chord when the dog barks.

The method for mounting the electrode 28 to the cover is similar to that of the other electrode 26, thus a detailed description is omitted.

Operation of the dog barking restraining device 10 thus constructed will be described hereinafter.

First of all, both ends of the cover 14 are fixed to both ends of the belt 1 by fastening means 16. The belt 1 is wrapped around the neck of the dog, the clamp means 2 is clamped to the other end of the belt 1 and the belt 1 is now worn around the neck of the dog.

When the dog barks, the belt 1 is wrapped around its neck, the vibration of the vocal chord is transmitted to the vibration signal detecting means 22 via the electrode 26.

Next, the frequency and amplitude corresponding to the vibration signal are transmitted from the vibration signal detecting means 22 to the control means 20.

The control means 20 now receives the vibration signal (frequency and amplitude) from the vibration signal detecting means 22 and compares the same with data previously stored in the control means 20. If the new signal data is greater than the data previously stored in the control means 20, a driving signal is output from the control means 20 to the impulse wave generating means 24.

At this time, the impulse wave generating means 24 applies the stepped up impulse wave to both ends of electrode 26 and electrode 28, so that a shock can be delivered to the neck (or skin) of the dog.

The impulse waves transformed from the stepped up voltage are repeatedly delivered to the neck of the dog from electrodes 26 and 28, so that the dog cannot bark because of pain around the neck.

If the dog is able to continue barking because of a weakened strength of the impulse wave, the belt 1 for the dog collar is unwrapped, and the impulse wave adjusting means 30 is adjusted by a driver or the like through the through hole 50 formed at the cover 14 to increase the strength of the impulse wave.

If the vibration signal detected by the vibration signal detecting means 22 is less than the data pre-stored in the control means 20, the control signal for generating the impulse wave from the control means 20 is not output to the impulse wave generating means 24, thereby causing the stepped up impulse wave of thousands of volts not to be delivered to the electrode 26.

As apparent from the foregoing, according to the dog barking restraining device, a belt worn around the neck of a dog is mounted with the dog barking restraining device, and a vibration signal generated whenever the dog barks is detected by the vibration signal detecting means via the electrodes and output to the control means.

The vibration signal input from the vibration signal detecting means is compared at the control means with a data pre-stored in the control means, and as a result of comparison, if the signal input from the vibration signal detecting means is greater than the stored data, a control signal for generating an impulse wave is output to the impulse wave generating means to cause the stepped up impulse wave to be applied to the neck of the dog and to thereby refrain the dog from barking.

What is claimed is:

1. A dog barking restraining device, the device comprising:

DC power source means;

vibration signal detecting means for detecting a vibration signal generated from a vocal chord of a dog when the dog barks;

control means for receiving a signal of the vocal chord of the dog detected by the vibration signal detecting means and generating a control signal which determines whether or not to elicit an impulse wave;

impulse wave generating means for generating the impulse wave according to said control signal received from the control means;

impulse wave strength adjusting means for adjusting the strength of the impulse wave output from the impulse wave generating means;

a pair of electrodes for applying to the neck of the dog the impulse wave generated in the impulse wave generating means; said electrodes operably connected to said vibration detection means such that the vibration signal generated from the vocal chord of the dog is transmitted through the electrodes to said vibration detection means.

2. A dog barking restraining device as defined in claim 1 further comprising an electrode housing and an electrode cap and a cover wherein, each electrode is supportingly jointed within said electrode housing by a bolt disposed in a through-hole formed at said cover;

the electrode housing is inserted via said electrode cap into a through-hole formed at the cover and is formed at a periphery thereof with a ring-shaped flange and being fixed to an outwardly bent vibration transfer prevention unit integrally formed at the electrode cap in order to prevent the same from breaking away from the electrode cap; and the electrode cap being integrally formed at an upper part with the outwardly bent vibration transfer prevention unit, so that breakaway from the cover can be avoided, and at the same time, vibration of the cover can be prevented from being transmitted by way of an electrode support member wound around a periphery of the electrode wherein the electrode cap is made of a resilient material so that transmission of signals other than the vibration signal to the vibration signal detecting means can be prevented.

3. A dog barking restraining device as defined in claim 2, wherein there is disposed between the vibration detecting means and the electrode housing an O ring made of natural rubber, silicone rubber, and there is formed within a round shaped O ring a silicone layer filled with silicone in order to cushion the vibration signal transmitted from the electrode.

4. A dog barking restraining device as defined in claim 2, wherein said cover further comprises a through-hole for adjusting the strength of the impulse wave generated from the impulse wave adjusting means.

\* \* \* \* \*